United States Patent [19]

Nalette et al.

[11] Patent Number: 5,079,209
[45] Date of Patent: Jan. 7, 1992

[54] PREPARATION OF HIGH CAPACITY UNSUPPORTED REGENERABLE CO₂ SORBENT

[75] Inventors: Timothy A. Nalette, Tolland; Philip J. Birbara, Windsor Locks; John R. Aylward, Vernon, all of Conn.

[73] Assignee: United Technologies Corporation, Hartford, Conn.

[21] Appl. No.: 490,016

[22] Filed: Mar. 7, 1990

[51] Int. Cl.⁵ .................... B01J 20/04; B01J 20/10
[52] U.S. Cl. .................................. 502/411
[58] Field of Search .............. 502/243, 407, 411; 423/230, 232

[56] References Cited

U.S. PATENT DOCUMENTS

| | | | |
|---|---|---|---|
| 3,579,305 | 5/1971 | Neti | 423/230 |
| 3,847,837 | 11/1974 | Boryta | 423/230 |
| 4,050,981 | 9/1977 | Jamieson et al. | 162/37 |
| 4,284,528 | 8/1981 | Lancet et al. | 423/230 |
| 4,304,761 | 12/1981 | Yao | 423/213.2 |
| 4,552,767 | 11/1985 | Saleeb et al. | 423/230 |
| 4,758,251 | 7/1988 | Swedo et al. | 55/16 |

OTHER PUBLICATIONS

"Metal Oxide Regenerable Carbon Dioxide Removel System for an Advanced Portable Life Support System", M. S. Nacheff, G. V. Colombo, C. H. Change and R. Cusick, SAE Technical Paper Series, 19th Intersociety Conf. on Environmental Systems, San Diego, Calif., Jul. 24–26, 1989.

"Study of $CO_2$ Sorbents for Extravehicular Activity", G. V. Colombo, NASA, 7/1973.

Primary Examiner—Carl F. Dees
Attorney, Agent, or Firm—Pamela J. Mercier

[57] ABSTRACT

A technique for preparing an unsupported, high capacity $CO_2$ sorbent. The sorbent is comprised of silver carbonate, alkali metal silicate and alkaline earth metal salt binders for structural integrity, and alkali metal carbonate for $CO_2$ sorption promotion. The sorbent disclosed in this invention has a high silver oxide density, consumes minimum volume, exhibits high $CO_2$ absorption rates, and resists dusting and degradation for at least 50 absorption/desorption cycles.

21 Claims, No Drawings

PREPARATION OF HIGH CAPACITY UNSUPPORTED REGENERABLE $CO_2$ SORBENT

TECHNICAL FIELD

This invention relates to the preparation of a sorbent, and especially to the preparation of an unsupported, high capacity, regenerable carbon dioxide sorbent.

BACKGROUND ART

Regenerable solid metal oxide carbon dioxide ($CO_2$) sorbents can be produced via paste extrusions and pelletization methods. However, the cyclical life of these regenerable $CO_2$ sorbents is limited. Cyclical absorption and desorption operations of solid metal oxide regenerable $CO_2$ sorbents cause volume changes which result in particle deterioration and breakage; "dusting". This eventually leads to increased sorbent bed pressure drop; resulting in higher power requirements. It is common knowledge in the art that the cyclical life of many regenerable metal oxide sorbents can be increased by the addition of binders or by depositing the active ingredients of the sorbents on inactive supports, such as porous ceramics or carbons, to impart strength and provide high gas/solid contact areas. However, the use of supports and high binder concentrations is undesirable in applications where high $CO_2$ loading densities, in addition to weight and power considerations, are crucial factors.

What is needed in the art is a regenerable $CO_2$ sorbent which provides high loading densities, structural integrity, and high rates of $CO_2$ sorption. Disclosure of Invention This invention discloses a regenerable carbon dioxide ($CO_2$) sorbent, a process for producing said regenerable $CO_2$ sorbent. The sorbent consists of pellets comprised of silver carbonate, binders, and a $CO_2$ sorption promoter, and is prepared by mixing silver carbonate pellets with a alkali metal silicate and alkaline earth metal salt binders, and an alkali metal carbonate $CO_2$ sorption promoter.

The foregoing and other features and advantages of the present invention will become more apparent from the following description and accompanying drawings.

BEST MODE FOR CARRYING OUT THE INVENTION

The preparation of the sorbent in the present invention consists of forming silver carbonate into pellets of varying shapes, which are held together by electrostatic forces, and contacting these pellets with an aqueous solution containing alkali metal silicate and alkali metal carbonate. The pellets are dried to remove excess solvent, and are contacted with a soluble alkaline earth metal salt which forms an additional external coating; further enhancing pellet strength. Note, heat and vacuum can be applied to accelerate drying.

An aqueous solution is prepared for contact with silver carbonate by dissolving alkali metal silicate and alkali metal carbonate in a solvent. The solution is intimately contacted with the silver carbonate, causing the alkali metal carbonate to impregnate the pellet, and the alkali metal silicate and silver carbonate to react forming a silicate coating. The intimate contact can be accomplished by any method which provides gentle tumbling of the pellets, such as a rotary tumbler, or other suitable mixing device known in the art. The pellets are then dried; any method which will insure uniform deposition of the alkali metal silicate and alkali metal carbonate can be utilized, such as a rotary evaporator. A solution of alkaline earth metal salt is prepared and intimately contacted with the dried pellets, as described above. The pellets are again dried, and sieved to remove dust and fines. Once this is complete, the pellets are heated to a temperature sufficient to convert the silver carbonate to silver oxide; liberating $CO_2$.

The preferred solvent is water, although it is possible to utilize any solvent which is inert with relation to the components of the sorbent.

The silver carbonate pellets can either be purchased or fabricated from powder via techniques conventionally known in the art, such as utilizing pelletizers or tablet presses. The pellet size, limited by system pressure drop considerations, typically ranges from about 0.30 mm to about 3.00 mm, with a pellet size between about 0.60 mm to about 1.50 mm preferred for closed system applications.

The preferred alkaline metal silicates include sodium and potassium silicate, and mixtures thereof, although it is feasible to utilize other alkali metal silicates, which are soluble in the selected solvent. The silicate forms a thin exterior coating which imparts strength to the pellet structure. The desirable amount of silicate is determined via a balance between the optimum structural integrity and maximum reaction rates. Large amounts of silicate impart strength, but also clog the pores reducing sorption rates. Approximately 3.0 wt % to about 8.0 wt % silicate is preferred, with about 5.0 wt % especially preferred.

Alkali metal carbonates, such as carbonates of cesium, potassium, and sodium, and mixtures thereof, distribute throughout the pellet's interior structure and serve as a $CO_2$ sorption promoters. As is well known in the art, the high pH associated with alkali metal carbonates enhances the $CO_2$ sorption rate. Since silver oxide has only a moderately alkaline pH, approximately 10.2, the addition of the alkali metal carbonate significantly increases the pellet's alkalinity; enhancing the rate of $CO_2$ sorption. An alkali metal carbonate wt% of between about 8.0% and about 20.0% is preferred, with about 10.0 wt % especially preferred.

The alkaline earth metal salt binder concentration is preferably between about 2.0 wt % to about 5.0 wt %, with about 3.0 wt % especially preferred. As with the alkali metal silicate, factors such as structural integrity and sorption rates must be taken into consideration when determining the amount of alkaline earth metal salt binder to be utilized. Various alkaline earth metal salt binders can be utilized, with nitrates and chlorides of calcium, magnesium, and barium, and mixtures thereof preferred; such as calcium chloride, magnesium chloride, barium nitrate, calcium nitrate, among others.

The wt % of silver carbonate, alkali metal silicate, alkali metal carbonate, and alkaline earth metal salt to utilized are determined by the desired wt % of each in the final product. Any solvent used in the production process is evaporated.

The prepared sorbent, once having been screened to remove any dust and fines, can be loaded into a reactor for the removal of $CO_2$ from a gaseous stream, typically air. The sorbent is then activated for $CO_2$ sorption by heating it to temperatures sufficient of convert the silver carbonate to silver oxide. Typically these temperatures will be about 160° C. to about 220° C. Note, temperatures above about 250° C. can irreversibly damage the silver oxide sorption abilities. After cooling to near ambient temperatures, the sorbent is capable of removing $CO_2$. For example, air in a closed environment is passed through the reactor where the alkali metal carbonate reacts with the $CO_2$ and water in the air to form the bicarbonate ion. The silver oxide then reacts with the bicarbonate ion to form silver carbonate, alkali metal carbonate, and water; leaving the alkali metal uninhibited from continuing to remove carbon dioxide from the air stream.

Once the silver oxide content is converted to the carbonate form, the reactor bed loses its $CO_2$ sorption capabilities and is ready for regeneration. Regeneration consists of heating the sorbent bed to a temperature sufficient to cause $CO_2$ liberation; converting the silver carbonate to silver oxide. Typically temperatures between about 160° C. to about 220° C. are sufficient for $CO_2$ liberation.

Since the sorbent is unsupported, no inert support is utilized, it contains a higher silver oxide density than the prior art. Also, due to the binder coating, the sorbent resists dusting and degradation for at least 50 absorption/desorption cycles; while other regenerable metal oxide sorbents, known in the art, begin dusting in the very early cycles, if not immediately. The following is a generic method which can be utilized to produce a carbon dioxide sorbent comprised of: 2.0 wt % to 5.0 wt % calcium nitrate and 3.0 wt % to 5.0 wt % sodium silicate, 10.0 wt % to 20.0 wt % potassium carbonate, and 70.0 wt % to 85.0 wt % silver carbonate.

1. The silver carbonate powder pelletized in a rotating disk agglomerator, and sieved to provide between 0.60 mm to 1.40 mm diameter pellets.
2. A sodium silicate/potassium carbonate solution is mixed with the pellets. To insure uniform coating, a rotating flask is utilized. The aqueous solution is added at a level that provides 3.0 to 5.0 wt % sodium silicate and 10.0 to 20.0 wt % of the potassium carbonate to the pellet. The silicate uniformly concentrates on the exterior surface of the gently tumbling pellets and serves to enhance the structural integrity of the pellet. The potassium carbonate is uniformly distributed within the pellet and serves to enhance the rate of $CO_2$ sorption.
3. The excess aqueous solvent is evaporated from the solution/pellet mixture by using a rotating vacuum flash evaporator and applying heat to the mixture to a temperature level ranging from 50° C. to 90° C. Use of the rotating flash evaporator insures that the sodium silicate and potassium carbonate are uniformly deposited.
4. Calcium nitrate, to provide 2.0 wt % to 5.0 wt %, is then added as in step 2 to further enhance the structural integrity of the pellet. The wetted pellets are dried as in step 3.
5. The coated/impregnated pellets are sieved prior to use to remove fines and dust.
6. The pellets are packed within a reactor. The reactor is heated to a temperature level between 160° C. to 220° C. to convert the silver carbonate to silver oxide. An air purge flow through the bed assists in the removal of the $CO_2$ and water released from the pellets. After cooling the beds to near ambient conditions, the sorbent is ready to remove $CO_2$. This procedure is repeated when it is required to regenerate the $CO_2$ sorption capabilities of the sorbent. Pellets prepared by this example have been shown to have $CO_2$ loading densities ranging from about 12.0 to 15.0 lbs/ft$^3$; between about 0.274 to about 0.340 moles/ft$^3$.

This invention relates to the production of a regenerable $CO_2$ sorbent capable of high $CO_2$ loading densities, and relatively devoid of the low $CO_2$ sorption rates and dusting problems which plague the art of regenerable metal oxide $CO_2$ sorbents. Since this sorbent doesn't require a support, contains a relatively low binder content, and has a high metal oxide density, it consumes minimum volume; making it ideal for closed environmental applications.

Although this invention has been shown and described with respect to detailed embodiments thereof, it will be understood by those skilled in the art that various changes in form and detail thereof may be made without departing from the spirit and scope of the claimed invention.

We claim:

1. A method for preparation of regenerable metal oxide $CO_2$ sorbent, said method using silver carbonate, an alkali metal silicate, an alkali metal carbonate, and an alkaline earth metal salt, which comprises:
   a. pelletizing silver carbonate, wherein pellets are formed;
   b. preparing an aqueous solution of alkali metal silicate and alkali metal carbonate, wherein the amount of alkali metal silicate and alkali metal carbonate are determined via the desired wt% of each in the final product;
   c. contacting said pellets with said alkali metal silicate/alkali metal carbonate aqueous solution, thereby forming silicate coated, alkali metal carbonate impregnated pellets;
   d. drying said silicate coated, alkali metal carbonate impregnated pellets;
   e. preparing an aqueous solution of alkaline earth metal salt, wherein the amount of alkaline earth metal salt utilized is determined by the desired wt% of alkaline earth metal salt in the final product;
   f. contacting said silicate coated/alkali metal carbonate impregnated pellets with said alkaline earth metal salt aqueous solution, thereby forming an alkaline earth metal coating on said silicate coated, alkali metal carbonate impregnated pellets;
   g. drying said alkaline earth metal/silicate coated, alkali metal carbonate impregnated pellets.

2. A method as in claim 1 wherein the pellet size ranges from about 0.30 mm to about 3.00 mm in diameter.

3. A method as in claim 1 wherein the alkali metal silicate is selected from the group consisting of sodium and potassium silicate, and mixtures thereof.

4. A method as in claim 1 wherein the alkali metal carbonate is selected from the group consisting of cesium, potassium, and sodium carbonate, and mixtures thereof.

5. A method as in claim 1 wherein the alkaline earth metal salt is selected from the group consisting of nitrates and chlorides of calcium, magnesium, barium, and mixtures thereof.

6. A method as in claim 1 wherein contacting and drying of said pellets with said alkali metal silicate/alkali metal carbonate aqueous solution, and alkaline earth metal salt aqueous solution is preformed within a rotatory evaporator.

7. A method as in claim 1 wherein heat is applied to any of the operations to reduce sorbent preparation time.

8. A method as in claim 1 wherein the desired wt % of alkali metal silicate in the final product is between about 3.0 wt % to about 8.0 wt %.

9. A method as in claim 1 wherein the desired wt % of alkali metal carbonate in the final product is between about 8.0 wt % to about 15.0 wt %.

10. A method as in claim 1 wherein the desired wt % of alkaline earth metal salt in the final product is between about 2.0 wt % to about 5.0 wt %.

11. A regenerable metal oxide $CO_2$ sorbent, which comprises:
    a. silver carbonate for $CO_2$ sorption;
    b. alkali metal silicate and alkaline earth metal salt as binders;
    c. alkali metal carbonate as a sorption promoter.

12. A regenerable metal oxide $CO_2$ sorbent as in claim 11, wherein said sorbent preparation comprises:
    a. pelletizing silver carbonate, wherein pellets are formed;
    b. preparing an aqueous solution of alkali metal silicate and alkali metal carbonate, wherein the amount of alkali metal silicate and alkali metal carbonate to utilize is determined via the desired wt % of alkali metal silicate and alkali metal carbonate in the final product;
    c. contacting said pellets with said alkali metal silicate/alkali metal carbonate aqueous solution, thereby forming silicate coated, alkali metal carbonate impregnated pellets;
    d. drying said silicate coated, alkali metal carbonate impregnated pellets;
    e. preparing an aqueous solution of alkaline earth metal salt, wherein the amount of alkaline earth metal salt to utilize is determined by the desired wt % of alkaline earth metal salt in the final product;
    f. contacting said silicate coated, alkali metal carbonate impregnated pellets with said alkaline earth metal salt aqueous solution, thereby forming an alkaline earth metal coating on said silicate coated, alkali metal carbonate impregnated pellets;
    g. drying said alkaline earth metal/silicate coated, alkali metal carbonate impregnated pellets.

13. A regenerable metal oxide $CO_2$ sorbent as in claim 12 wherein the pellet size ranges from about 0.30 mm to about 3.00 mm in diameter.

14. A regenerable metal oxide $CO_2$ sorbent as in claim 12 wherein contacting and drying of said pellets with said alkali metal silicate/alkali metal carbonate aqueous solution, and said alkaline earth metal salt aqueous solution is preformed within a rotatory evaporator.

15. A regenerable metal oxide $CO_2$ sorbent as in claim 12 wherein the desired wt % of alkali metal silicate in the final product is between about 3.0 wt % to about 8.0 wt %.

16. A regenerable metal oxide $CO_2$ sorbent as in claim 12 wherein the desired wt % of alkali metal carbonate in the final product is between about 8.0 wt % to about 15.0 wt %.

17. A regenerable metal oxide $CO_2$ sorbent as in claim 12 wherein the desired wt% of alkaline earth metal salt in the final product is between about 2.0 wt % to about 5.0 wt %.

18. A regenerable metal oxide $CO_2$ sorbent as in claim 11 wherein the alkali metal silicate is selected from the group consisting of sodium and potassium silicate, and mixtures thereof.

19. A regenerable metal oxide $CO_2$ sorbent as in claim 11 wherein the alkali metal carbonate is selected from the group consisting of cesium, potassium, and sodium carbonate, and mixtures thereof.

20. A regenerable metal oxide $CO_2$ sorbent as in claim 11 wherein the alkaline earth metal salt is selected from the group consisting of nitrates and chlorides of calcium, magnesium, barium, and mixtures thereof.

21. A regenerable metal oxide $CO_2$ sorbent as in claim 11 wherein heat is applied to any of the operations to reduce sorbent preparation time.

* * * * *

UNITED STATES PATENT AND TRADEMARK OFFICE
CERTIFICATE OF CORRECTION

PATENT NO. : 5,079,209

DATED : January 7, 1992

INVENTOR(S) : Timothy A. Nalette, Philip J. Birbara, John R. Aylward

It is certified that error appears in the above-identified patent and that said Letters Patent is hereby corrected as shown below:

Claim 1, Column 4, Line 19, after "of" insert --a--

Claim 9, Column 5, Line 9, "15.0" should be --20.0--

Claim 16, Column 6, Line 20, "15.0" should be --20.0--

Signed and Sealed this

Thirty-first Day of August, 1993

*Attest:*

BRUCE LEHMAN

*Attesting Officer*    Commissioner of Patents and Trademarks